(12) United States Patent
Bouriant

(10) Patent No.: US 8,126,573 B2
(45) Date of Patent: Feb. 28, 2012

(54) METHOD AND DEVICE FOR OPTIMIZING PROCESSES

(75) Inventor: Alexandre Bouriant, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 1517 days.

(21) Appl. No.: 10/524,950

(22) PCT Filed: Aug. 11, 2003

(86) PCT No.: PCT/DE03/02707
§ 371 (c)(1),
(2), (4) Date: Feb. 22, 2005

(87) PCT Pub. No.: WO2004/021229
PCT Pub. Date: Mar. 11, 2004

(65) Prior Publication Data
US 2006/0010018 A1    Jan. 12, 2006

(30) Foreign Application Priority Data
Aug. 23, 2002  (DE) .................................. 102 38 831

(51) Int. Cl.
*G05B 15/00* (2006.01)
*G05B 11/01* (2006.01)
*G05B 13/02* (2006.01)
*G06Q 10/00* (2006.01)

(52) U.S. Cl. ............... 700/1; 700/28; 700/36; 705/7.37; 705/7.38; 705/7.11; 705/7.12

(58) Field of Classification Search ............. 700/1, 291, 700/28, 36; 705/7, 7.37, 7.38, 7.11, 7.12, 705/7.29, 7.17
See application file for complete search history.

(56) References Cited

U.S. PATENT DOCUMENTS

| 5,158,078 | A  | * | 10/1992 | Bennett et al. .................. 607/27 |
| 5,402,519 | A  | * | 3/1995  | Inoue et al. ..................... 706/16 |
| 6,004,579 | A  | * | 12/1999 | Bathurst et al. ............... 424/450 |
| 6,708,155 | B1 | * | 3/2004  | Honarvar et al. ............ 705/7.36 |
| 6,925,338 | B2 | * | 8/2005  | Eryurek et al. ................. 700/30 |
| 6,952,808 | B1 | * | 10/2005 | Jamieson et al. ............. 715/833 |
| 6,957,201 | B2 | * | 10/2005 | Alhadef et al. ................. 706/16 |
| 7,191,143 | B2 | * | 3/2007  | Keli et al. .................... 705/7.32 |
| 2001/0017023 | A1 | * | 8/2001 | Armington et al. ............. 53/472 |
| 2001/0039519 | A1 | * | 11/2001 | Richards ........................ 705/27 |
| 2001/0047293 | A1 | * | 11/2001 | Waller et al. .................. 705/10 |
| 2002/0123905 | A1 | * | 9/2002  | Goodroe et al. ................. 705/2 |
| 2002/0178014 | A1 | * | 11/2002 | Alexander ....................... 705/1 |
| 2003/0088456 | A1 | * | 5/2003  | Ernest et al. .................. 705/10 |
| 2003/0120528 | A1 | * | 6/2003  | Kruk et al. ...................... 705/7 |
| 2003/0139854 | A1 | * | 7/2003  | Kolk et al. .................... 700/291 |

(Continued)

FOREIGN PATENT DOCUMENTS
DE             195 19 627 A1    12/1998
(Continued)

*Primary Examiner* — Albert Decady
*Assistant Examiner* — Jason Lin

(57) ABSTRACT

The invention relates to a process-optimizing device, particularly a manufacturing execution system device. Such a process-optimizing MES device is mounted between an enterprise production planning system, especially an enterprise resource planning device, and a control system, particularly a process instrumentation and control device. The inventive MES device comprises at least one optimization unit for influencing one or several process parameters of the control system, especially the PLT device, at least one data-determining unit for monitoring the process parameter/s, and at least one evaluation unit for automatically determining an optimization of the process parameter/s, which is created by the optimization unit/s.

22 Claims, 5 Drawing Sheets

U.S. PATENT DOCUMENTS

2003/0195791 A1* 10/2003 Waller et al. .................. 705/10
2004/0049311 A1* 3/2004 Kuntze et al. ................ 700/173
2004/0113912 A1* 6/2004 Brooks et al. ................ 345/440

FOREIGN PATENT DOCUMENTS

DE 197 42 906 A1 5/1999
EP 0 500 997 A1 9/1992
WO WO 02/19209 A2 3/2002

* cited by examiner

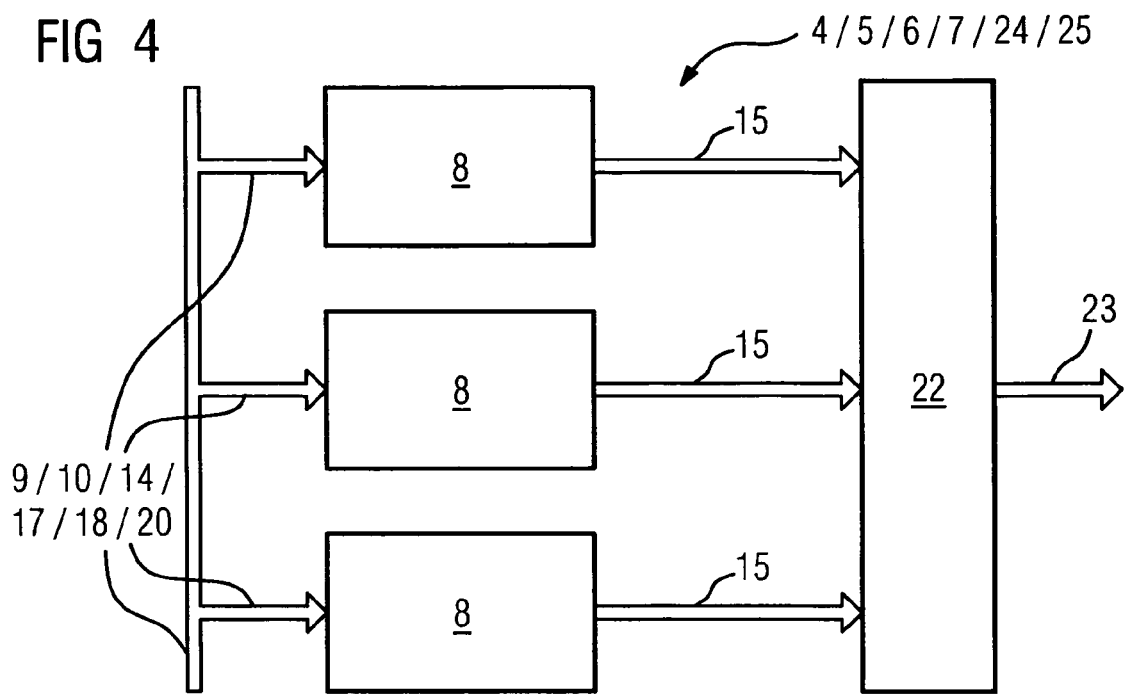
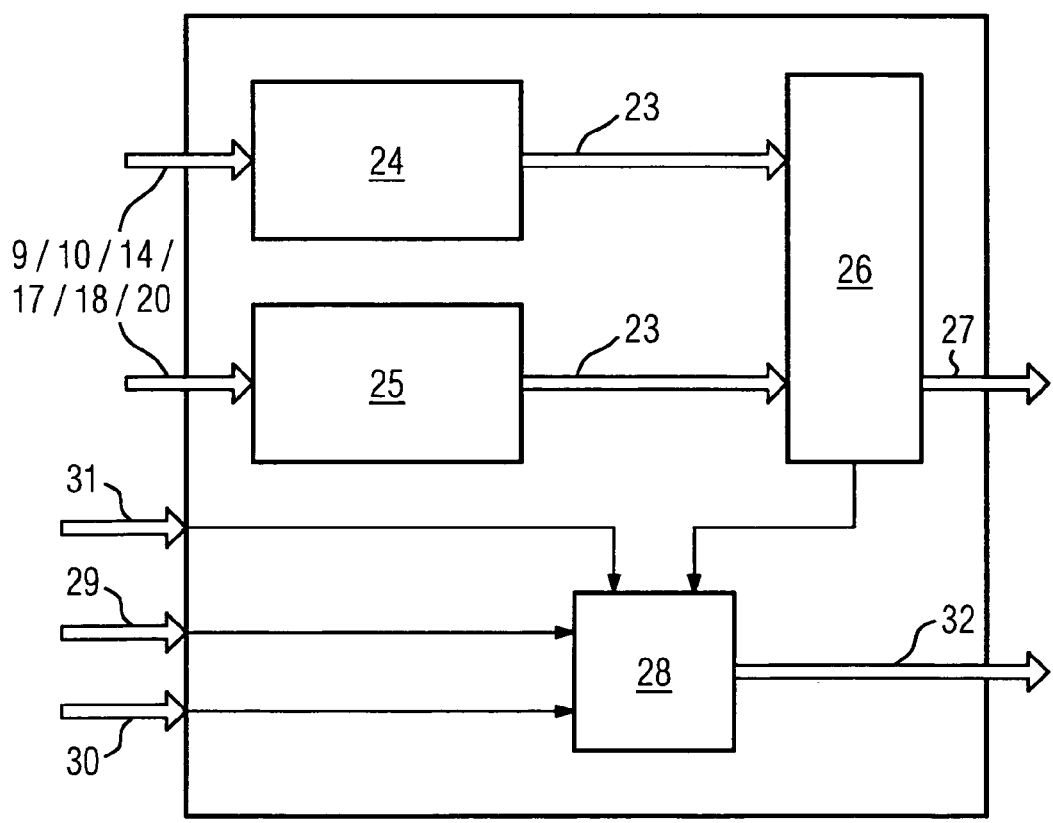

US 8,126,573 B2

METHOD AND DEVICE FOR OPTIMIZING PROCESSES

CROSS REFERENCE TO RELATED APPLICATIONS

This application is the US National Stage of International Application No. PCT/DE2003/002707, filed Aug. 11, 2003 and claims the benefit thereof. The International Application claims the benefits of German application No. 10238831.8 filed Aug. 23, 2002, both applications are incorporated by reference herein in their entirety.

FIELD OF THE INVENTION

The invention relates to a process-optimizing device and a method for optimizing processes. The invention further relates to an MES device for optimizing processes.

BACKGROUND OF THE INVENTION

Processes which execute in a factory, in particular production processes or manufacturing processes, are normally controlled or governed by a monitoring and control system, in particular by a PLT device. The abbreviated term PLT device refers to a device for process instrumentation and control, where this can be an SPC control system (e.g. a programmable logic control, a programmable controller or a programmable control system), for example. The administrative planning of a process which executes in the factory and is controlled or governed with the aid of a PLT device, for example, is generally performed using an enterprise and production planning system. An enterprise and production planning system can be an ERP device, for example. The abbreviated term ERP device refers to a device for enterprise resource planning. However, an SCM device (supply chain management device) or a CPM device (collaborative production manufacturing device) can also be used as an enterprise and production planning system. Such an enterprise and production planning system, e.g. in the form of an ERP device, is used for ordering the raw materials which are required for a manufacturing process, for example. In order to link the monitoring and control system, which takes the form of e.g. a PLT device, and the enterprise and production planning system, which takes the form of e.g. an ERP device, and therefore ultimately to optimize the process which executes in the factory, the prior art already provides for connecting a so-called MES device between the PLT device and the ERP device. The abbreviated term MES device refers to a device for a manufacturing execution system. Using such an MES device, a connection and a data exchange are therefore established between the administrative ERP device and the process-oriented PLT device, and consequently the process which is controlled or governed via the PLT device is ultimately optimized.

Where reference is made to an ERP device in the following, this can also be understood to include an enterprise and production planning system in the form of an SCM device or a CPM device. Likewise where reference is made to a PLT device, this can also be understood equally to include a monitoring and control system of a different design.

In connection with the use of an MES device, it is obviously of interest whether the investment costs for such an MES device are recouped by the production optimization which is achieved. In other words, when deciding whether or not to procure a MES device, it is important for the decision-makers to know whether and in what timescales a return of investment can be achieved for the MES device.

In accordance with the prior art, only empirical experience values are available for this purpose. Estimated return of investment values from comparable projects are therefore used to decide whether or not an MES device, i.e. a process-optimizing device, is procured for a new project. However, the prior art does not suggest any process-optimizing devices or MES devices which can assist in providing information about the return of investment which is actually achieved using such a device.

SUMMARY OF THE INVENTION

The present invention addresses the problem of creating an improved device for process optimization, a corresponding method and an improved MES device.

These problems are solved by the claims.

Information about the actual return of investment can be determined automatically using a device which is designed in accordance with the invention or using the method in accordance with the invention. Therefore investment decisions need no longer be based on empirical experience values.

According to an advantageous development of the invention, an evaluation entity is assigned to each of the process parameters which has to be optimized, said process parameters being influenced by one or more optimization entities, in such a way that the evaluation entity is capable of determining the optimization of the relevant process parameter online and in real-time, said optimization being produced by the corresponding optimization entities. Consequently, it is possible to determine and analyze, selectively and independently of the other process parameters, the actual return of investment with reference to each process parameter which has to be optimized.

These evaluation entities preferably have evaluation modules, wherein a first evaluation module is used for automatically determining a cost saving which is produced with reference to a specific process parameter, and a second evaluation module is used for automatically determining a yield increase which is produced with reference to said specific process parameter. Consequently, an even more detailed analysis of the return of investment is possible. As a result of this development of the invention therefore, the actual influence of each individual optimization entity on each individual process parameter can be determined and analyzed.

In accordance with a preferred development of the invention, all evaluation entities are linked to an overall evaluation entity in such a way that the overall evaluation entity is capable of determining the effected overall optimization of all process parameters online and in real-time. The overall return of investment which is achieved by the device according to the invention can therefore be determined easily and automatically.

BRIEF DESCRIPTION OF THE DRAWINGS

Preferred developments of the invention derive from the dependent claims and from the following description. An exemplary embodiment of the invention is explained in further detail with reference to the drawing in which:

FIG. 4 shows a block diagram of a plurality of evaluation modules which are connected together, FIG. 5 shows a block diagram of a plurality of evaluation entities which are connected together.

DETAILED DESCRIPTION OF THE INVENTION

Figure 1:
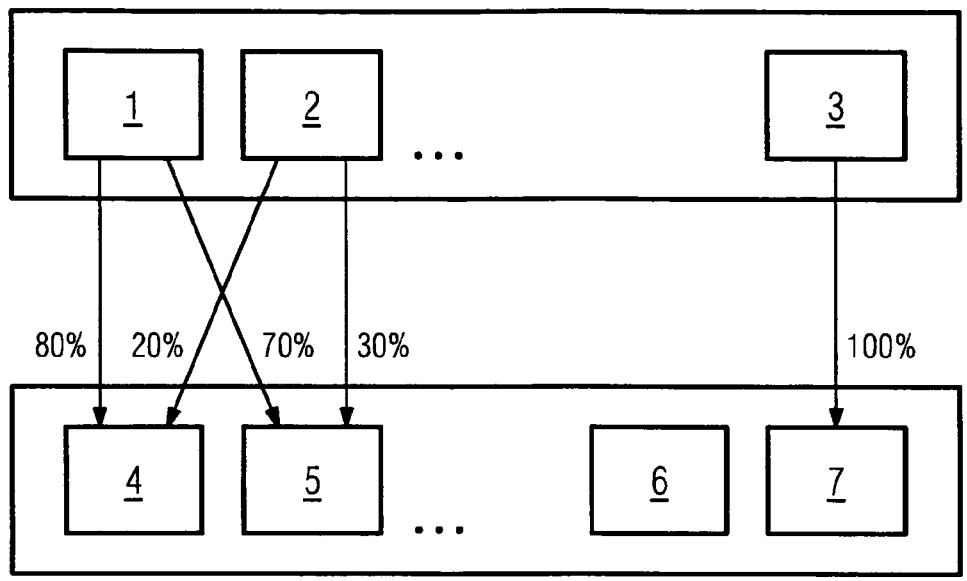
FIG. 1 shows a highly schematized block diagram of the device according to the invention for process optimization, illustrating the dependencies and interactions among a plurality of optimization entities and a plurality of process parameters or evaluation entities which are assigned to the process parameters.

FIG. 1 shows a highly schematized block diagram of a device for process optimization as claimed in the invention, or an MES device as claimed in the invention. According to FIG. 1, the device according to the invention includes a plurality of optimization entities 1, 2, 3 which are also designated as functional components of the device according to the invention, namely the MES device according to the invention. The optimization entities 1, 2, 3 of the MES device according to the invention influence processes, which are not illustrated in detail, of a process which executes in a factory, for example, and is controlled or governed with the aid of a PLT device. In accordance with the invention, an evaluation entity 4, 5, 6, 7 is assigned to each of the process parameters which must be optimized. According to this, the process parameters which must be optimized are also concealed behind the evaluation entities 4 to 7. As illustrated in FIG. 1, an optimization entity 1, 2, 3 or a functional component of the MES device according to the invention can have an influence on one or more process parameters. Thus FIG. 1 shows that an optimization entity 1 exercises influence both on the process parameter which interacts with the evaluation entity 4 and on the process parameter which interacts with the evaluation entity 5. The optimization entity 2 in FIG. 1 likewise influences the process parameters which interact respectively with the evaluation entity 4 and the evaluation entity 5. By contrast, the optimization entity 3 influences only the process parameter which interacts with the evaluation entity 7. Therefore individual process parameters which must be optimized can be influenced by one optimization entity alone or by a plurality of optimization entities concurrently. However, it is significant in this context that the overall influence which is exercised on a process parameter by a plurality of optimization entities can only ever amount to 100 percent. In the exemplary embodiment which is shown in FIG. 1, this means that the process parameter which interworks with the evaluation entity 4 is influenced 80 percent by the optimization entity 1 and 20 percent by the optimization entity 2, for example. The process parameter which interworks with the evaluation entity 5 is influenced 70 percent by the optimization entity 1 and 30 percent by the optimization entity 2, for example. In each case, however, the total of all of the optimization quotas which are applied to an individual process parameter by the optimization entities is 100 percent. With regard to the optimization entity 3, this means that the process parameter which interacts with the evaluation entity 7 is influenced solely and therefore 100 percent by the optimization entity 3.

In accordance with the invention, the next step is to determine automatically the actual optimizations of the individual process parameters as effected by the individual optimization entities 1, 2, 3 of the MES device according to the invention, online and in real time, and also to display the optimizations that were determined.

For this purpose, an evaluation entity 4, 5, 6, 7 is assigned as mentioned above to each process parameter which has to be optimized. The evaluation entities 4, 5, 6, 7 determine actual effected optimizations of the corresponding process parameters from reference values for the process parameters, which reference values were determined by a process that did not involve an MES device, and from process parameter values which were determined online. From the actual effected optimizations of the individual process parameters, the claimed invention can determine the effected overall optimization and therefore deduce a return of investment for the overall device.

Figure 3:
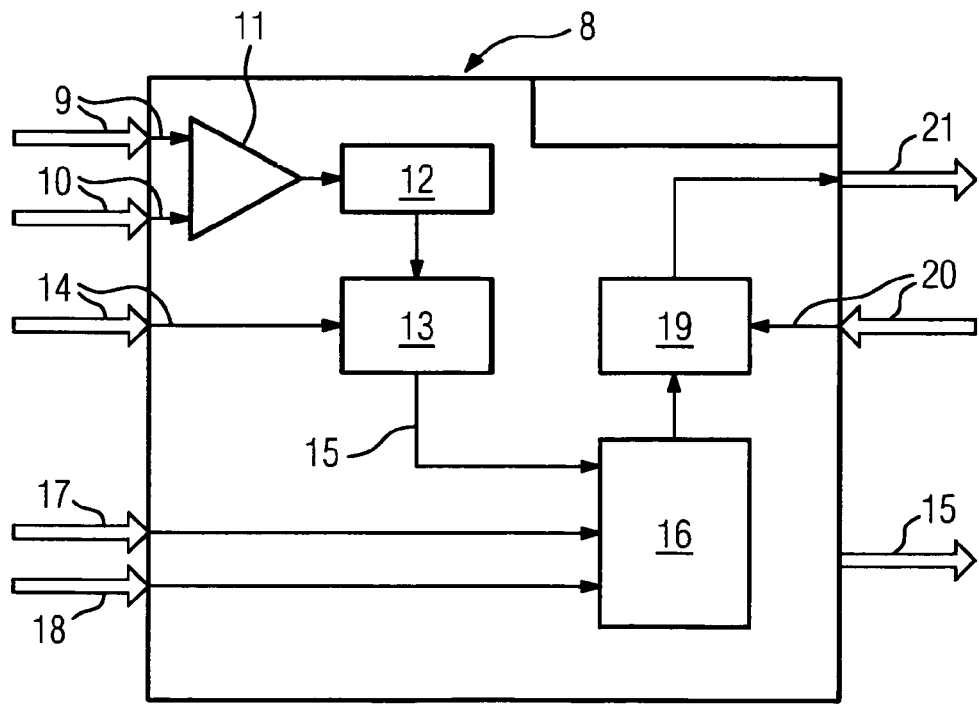
FIG. 3 shows a block diagram of an evaluation module of an evaluation entity of the device according to the invention for process optimization.

FIG. 3 shows a block diagram of an evaluation module 8 of the evaluation entities 4, 5, 6 and 7. Using such an evaluation module 8, it is possible to determine the optimization of an individual process parameter, said optimization being effected by an individual optimization entity, separately for each process parameter which has to be optimized and for each optimization entity. For this purpose, a reference value of the specific process parameter is supplied to the evaluation module 8 as a first input quantity 9. This reference value 9 is a value for the specific process parameter, which was determined in the absence of or during activation of or immediately following the activation of the device according to the invention for optimizing processes. An actual value of the process parameter, which value was determined online and in real time, is supplied to the evaluation module 8 as a second input quantity 10. The two input quantities 9, 10 are compared with each other in a comparator 11 of the evaluation module 8, and a difference between the two input quantities 9, 10 is determined. This determined difference is held in a memory 12. The difference between the two input quantities 9, 10, which difference is held in the memory 12, is supplied to a multiplier 13 by the evaluation module 8. The multiplier 13 apportions the difference between the two input quantities 9, 10 using a third input quantity 14. This value which is determined by the multiplier 13 forms a first output quantity 15 of the evaluation module 8.

As shown in FIG. 3, however, the output quantity which is provided by the multiplier 13 is also supplied to an integrator 16. In addition to the value 15 which is provided by the multiplier 13, two further input quantities 17, 18 of the evaluation module 8 are supplied to the integrator 16. The input quantity 17 is a reference time and the input quantity 18 is the currently determined time. The integrator 16 integrates the quantity 15 which is supplied by the multiplier over the time between the reference time which is supplied as input quantity 17 and the current time which is provided as input quantity 18, and supplies this value which is integrated over the time to a multiplier 19. In the multiplier 19, the value 15 which is provided by the multiplier 13 and the value which is integrated over the time by the integrator 16 are multiplied by a further input quantity 20 of the evaluation module 8. The input quantity 20 is the percental factor by which a specific optimization entity 1, 2, 3 exerts influence on a process parameter. This percental factor corresponds to the optimization quota which was already discussed in connection with FIG. 1. The value which is provided by the multiplier 19 serves as a second output quantity 21 of the evaluation module 8.

At this point, it should be indicated again that the output quantity 15 of the evaluation module 8 is the unapportioned output of the multiplier 13. However, the invention also suggests that, in the same way, the first output quantity 15 can also be the output of the multiplier 13, wherein said output has been apportioned using the corresponding optimization quota according to input quantity 20. It is also possible to provide both values as a first output quantity, i.e. the unapportioned output of the multiplier 13 and the apportioned output of the multiplier 13, the latter having been apportioned using the corresponding optimization quota.

As mentioned above, each process parameter which has to be optimized is assigned an evaluation entity 4, 5, 6, 7 which contains a plurality of evaluation modules 8. The evaluation entities determine an optimization which has been effected for a specific process parameter by all optimization entities which have an influence on this specific process parameter. By contrast, the individual evaluation modules 8 of the evaluation entities 4, 5, 6 and 7 determine this for each optimization entity individually. Therefore if a process parameter is influenced by two optimization entities, the evaluation entity which is assigned to the process parameter includes at least two evaluation modules. If a process parameter is influenced by two optimization entities to the sole extent that, for example, solely a cost saving is produced for the specific process parameter as a result of the presence of the two optimization entities, then only two evaluation modules 8 are present. However, if the two optimization entities effect both cost savings and yield increases in relation to the relevant process parameters, then the evaluation entity which is assigned to the process parameter would include a total of four evaluation modules, specifically two evaluation modules relating to the yield increase and two evaluation modules relating to the cost saving. The evaluation modules are then designed as illustrated in FIG. 3.

Accordingly, the evaluation module 8 which is illustrated in FIG. 3 can be an evaluation module for automatically determining an effected yield increase in connection with a process parameter. If the process parameter which must be optimized is an amount of manufacturable products, for example, a reference value which expressed the amount of products that could be manufactured without an MES device would be provided as an input value 9 to the evaluation module 8. The currently manufactured amount of products when the MES device according to the invention is present is supplied to the evaluation module 8 as input quantity 10. In the sense of an optimization, the amount of products that are produced when the MES device is present is naturally greater than the amount of products that can be produced without an MES device. In this case, the input quantity 14 represents the profit component per produced product. In this case, the output quantity 15 of the evaluation module 8 is therefore a yield increase or profit increase which relates to a specific process parameter and can be achieved with the aid of a specific optimization entity.

If the evaluation module 8 is an evaluation module for automatically determining an effected cost saving, an input quantity 9 being provided to the evaluation module 8 is, for example, an absolute amount of scrap parts which are produced without the presence of the MES device according to the invention. By contrast, the scrap parts which are actually and currently produced in the presence of the MES device according to the invention are provided as input quantity 10. In the sense of an optimization, the scrap parts that are actually produced are naturally fewer than the scrap parts that are produced without the presence of the MES device. This difference which is determined by the comparator 12 is then multiplied by the input quantity 14, which represents a cost saving per scrap part in this case.

Absolute values are provided as one output quantity 15, and values which are integrated over the time are determined as another output quantity 21.

Overall therefore, it should be reiterated that the evaluation module 8 which is illustrated in FIG. 3 assists in determining the optimization of a specific process parameter, said optimization being effected by a specific optimization entity, and in providing both an absolute optimization value and an optimization value which is integrated over the time in the form of output quantities 15, 21 respectively.

In accordance with FIG. 4, a plurality of evaluation modules 8 are combined in an evaluation entity 4, 5, 6, 7 which is assigned to a process parameter. In this case, FIG. 4 shows an evaluation entity having three evaluation modules 8. This would signify that a process parameter, to which the evaluation entity is assigned as per FIG. 4, is influenced by e.g. three optimization entities of the MES device according to the invention. All three optimization entities, whose actual effected optimization of the corresponding process parameter is determined by the evaluation module 8, contribute in part to the optimization of the parameter. The absolute output quantities 15 of the evaluation modules 8 are then supplied to a summer 22, which sums the output quantities 15 of the evaluation modules 8, thereby providing an absolute optimization of the corresponding process parameter, as effected by all participating optimization entities, in the form of an output quantity 23.

FIG. 5 shows a block diagram of a plurality of interconnected evaluation entities 24, 25 which are configured as illustrated in FIG. 4. The two evaluation entities 24, 25 are connected to an overall evaluation entity, thereby allowing the effected overall optimization of all process parameters to be determined online and in real time. For this, the output quantities 23 of the evaluation entities 24, 25 are supplied to a summer 26, which apportions together the effected optimizations of the individual process parameters, said optimizations having been determined with the aid of the evaluation entities 24, 25, in such a way that an effected absolute overall optimization of all process parameters can be determined. The summer 26 provides this absolute effected overall optimization of all process parameters as output quantity 27. This output quantity of the summer 26 is additionally supplied to an integrator 28. Time variables are supplied to the integrator 28 as further input quantities 29, 30, 31. The input quantity 29 is a reference time, specifically the time at which the MES device was put into operation. The input quantity 30 is the currently measured time. The input quantity 31 is an output quantity of a time normalizing entity which is described in detail below. On the basis of the output quantity of the summer 26 and the input quantities 29, 30 and 31, the integrator 28 determines a time-related overall optimization of all process parameters. This value is provided as output quantity 32.

In accordance with the invention, therefore, provision is made for an MES device, wherein the MES device comprises a plurality of optimization entities and wherein each of the optimization entities optimizes one or more process parameters. Each of the process parameters is assigned an evaluation entity. The evaluation entity determines the optimization, which has actually been effected by the optimization entities, of the relevant process parameter online and in real time. In order additionally to obtain detailed information about the extent to which a process parameter is influenced by the individual optimization entities which act on this process parameter, each evaluation entity has a plurality of evaluation modules. The optimization effect of a specific optimization entity on a specific process parameter can therefore be determined using the evaluation modules. On the basis of the output quantities of the evaluation modules, the evaluation entities then determine the optimization, which has been effected by the relevant optimization entities involved, of a specific process parameter. The output signals of the evaluation entities are then apportioned together in the summer 26 and the integrator 28, which together provide an overall evaluation entity, so that an effected overall optimization of all process parameters is automatically determined online and in real time.

In this way, it is possible online and in real time to determine the return of investment which is achieved with the aid of the MES device in a specific application scenario. Using the evaluation modules, it is therefore possible to determine which portion of return of investment is provided by each optimization entity of the MES device in relation to a specific process parameter. The evaluation entities determine a value which corresponds to the actual return of investment for all optimization entities of the MES device that contribute in relation to a specific process parameter. The overall actual return of investment of the MES device over all process parameters is determined via the summer 26 and the integrator 28 of the overall evaluation entity. The investment target or the investment value of an MES device can therefore be evaluated selectively for all optimization entities of the MES devices. It is possible to determine which optimization entity of the MES device has the greatest effect in relation to an optimization of the process or in relation to an amortization of the investment costs. Consequently, the return of investment of an MES device need no longer be estimated on the basis of empirical data, but can be determined in real time at any time.

As described above in connection with FIG. 3, in order to achieve this, current values must be provided to the evaluation modules via the process parameters as input quantities 10.

Figure 6:
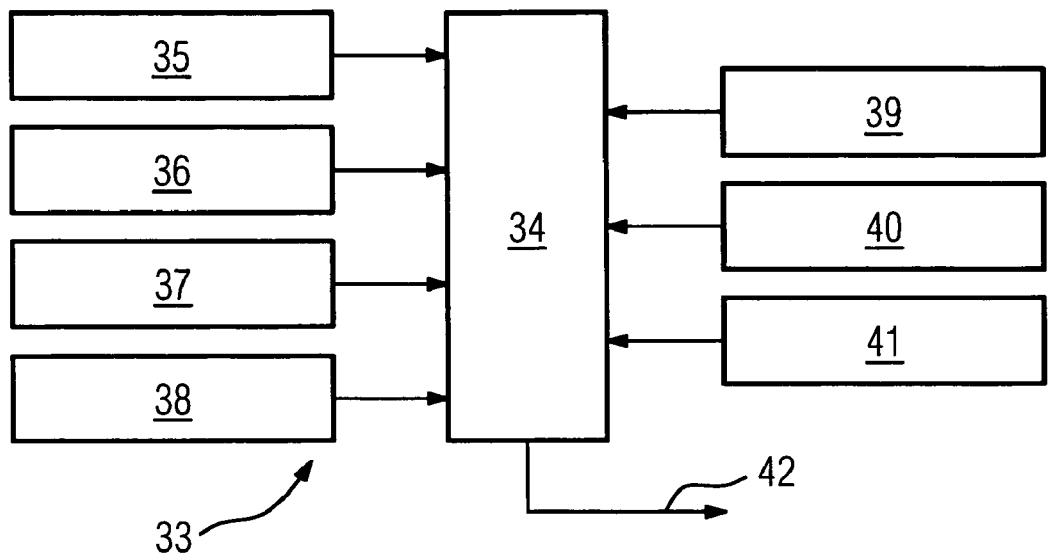
FIG. 6 shows a block diagram of a monitoring entity of the device according to the invention.

FIG. 6 shows a data determining entity 33, which firstly allows the current process parameters to be monitored and their values to be determined, and which secondly allows the capture of further variables or information which are necessary for determining the optimization success which is actually achieved or the return of investment which is currently achieved. The data determining entity 33 therefore includes a universal data browser 34. A plurality of input quantities are provided to the data browser 34. A first input quantity 35 represents the current values of the process parameter which must be optimized. These are measured using sensors at the PLT device, which sensors are not shown, and then provided to the data browser 34. As a second input quantity 36, variables of the MES device are provided to the data browser 34. These variables of the MES system can be, for example, the acquisition time and the acquisition value of the individual optimization entities of the MES device. As a third input quantity 37, variables of the ERP device are provided to the data browser 34. These represent administrative data such as unit costs of raw materials which are used in the process, selling prices, or similar. As a further input quantity 38, information about a system architecture of the PLT device is provided to the data browser 34 if required. This is described in further detail below in connection with FIG. 7. The input quantities 39 can be, for example, system inputs of an operator. The input quantities 40 can be information which is provided to the data browser 34 by a parallel system in the production. The input quantities 41 represent further variables which cannot be assigned to any of the other input quantities.

All these input quantities 35, 36, 37, 38, 39, 40 and 41 of the data browser 34 are made accessible in the data browser 34 and provided to the evaluation entities or evaluation modules as output quantity 42. The evaluation modules or evaluation entities are then able to determine the currently effected optimization or the currently achieved return of investment of the device according to the invention or the MES device according to the invention.

Figure 2:
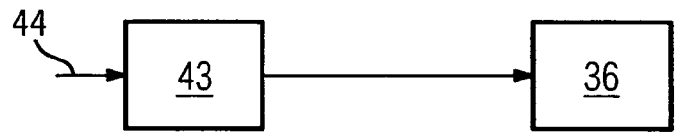
FIG. 2 shows a block diagram of an entity for specifying an investment cost structure of the device according to the invention for process optimization.

The investment cost structure of the MES device according to the invention as illustrated in FIG. 2, for example, can be one of the input quantities 36 of the data browser 34 which are mentioned in connection with FIG. 6. In order to ensure that the currently achieved optimization or the currently achieved return of investment can be correctly determined, the evaluation entities must be supplied with input quantities which contain information or data about the investment cost structure of the device according to the invention for process optimization. It is therefore not only the level of the investment costs of the overall device for process optimization which is significant, rather it is also necessary to provide data about how these investment costs are spread over the individual optimization entities of the device according to the invention. Furthermore, it is necessary to allow for such data as takes into account the investment-cost amortization which is possible on the basis of the current legal position. Determining the effected optimization in accordance with the invention can only be performed correctly using this data or on the basis of this data. Therefore an amortization model of the investment costs of the overall device according to the invention and the individual optimization entities of the same is stored in a database 43. The investment costs, broken down according to the individual optimization entities, are supplied to the database as input quantity 44. The input quantity 36 for the data browser 34 is then determined from the amortization model which is stored in the database 43, and from the investment costs. This then represents the investment cost structure of the device according to the invention for process optimization or of the MES device according to the invention. The acquisition costs of the overall MES device and all components of the same are stored in this investment cost structure. Furthermore, these investment costs are broken down over time on the basis of the legal requirements and the legal amortization possibilities.

Figure 7:
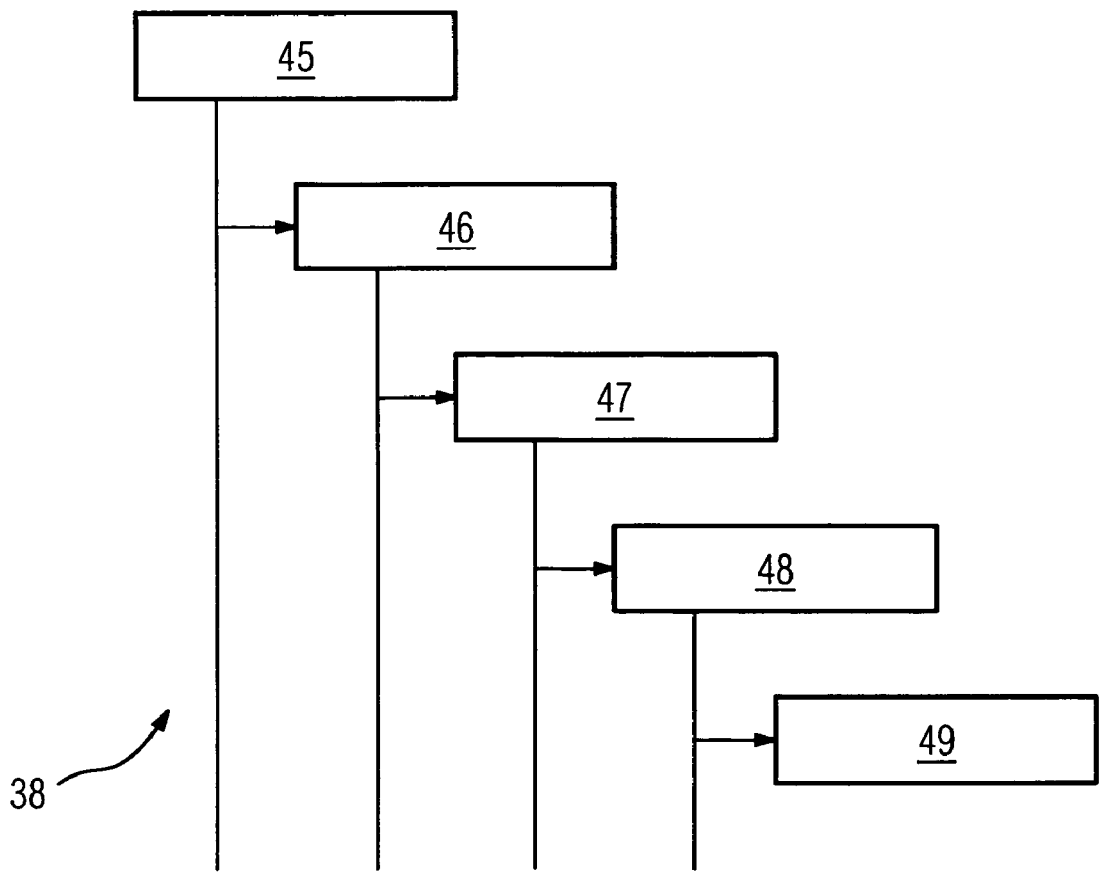
FIG. 7 shows a block diagram for illustrating a system architecture variable distribution for the device according to the invention for process optimization.

FIG. 7 shows the input quantity 38, which has already been mentioned in FIG. 6 and contains information about a system architecture of the PLT device. In the case of complex manufacturing processes and production plants, it is therefore necessary to structure the overall system. Only in this way is it possible correctly to determine the required input quantities of the device according to the invention. FIG. 7 therefore illustrates a production process which is controlled with the aid of a PLT device, said production process being subdivided into five hierarchical levels 45, 46, 47, 48, 49. The highest hierarchical level 45 is the overall production plant. This can be subdivided into a plurality of production entities which then represent the hierarchical level 46. Each production entity can be broken down into a plurality of areas which form the third hierarchical level 47. Within each area may be a plurality of cells, and within the cells the specific devices or equipment of the plant. The cells form the fourth hierarchical level 48 and the specific entities form the fifth hierarchical level 59. In accordance with the invention, it is now possible for the optimization entities of the device according to the invention for process optimization to have an influence on various hierarchical levels 45, 46, 47, 48 or 49 of the overall process.

If an optimization entity has an influence on the third hierarchical level 47, for example, all entities of the subordinate hierarchical levels 48 and 49 are influenced by the optimization entity. This information is required so that the optimization which is actually effected by an optimization device in relation to the overall plant can be determined. Furthermore, such a system architecture is required for monitoring and transferring the process parameters. In the case of complex processes which have to be optimized, the hierarchical level in which it is possible to determine a process parameter can only be specified using such a system architecture.

Figure 8:
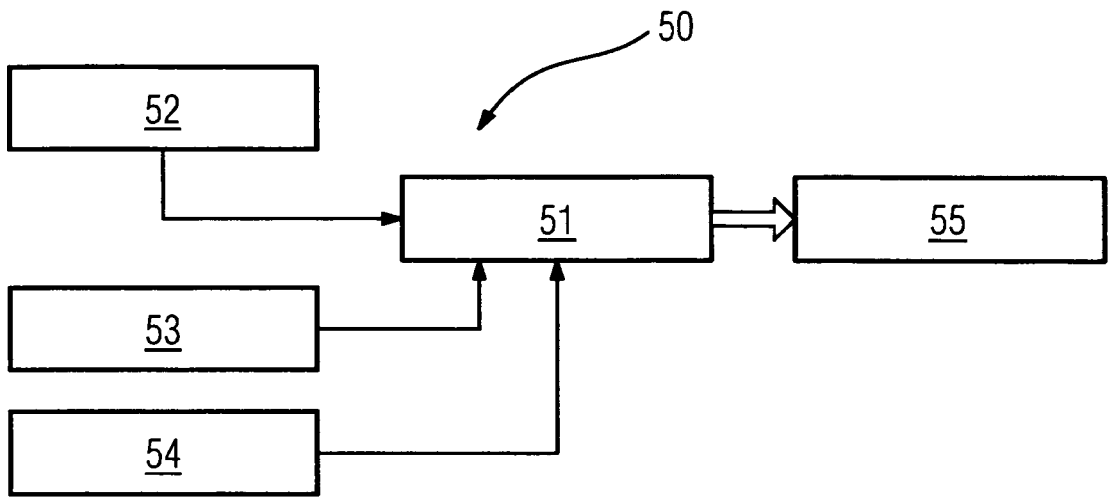
FIG. 8 shows a block diagram of a time normalizing entity of the device according to the invention for process optimization.

FIG. 8 illustrates a time normalizing entity 50 of the device according to the invention for process optimization. The time normalizing entity 50 which is shown in FIG. 8 is a time normalizing entity for the overall MES device. Therefore a total of three input quantities 52, 53, 54 are supplied to a time normalizer 51. The input quantity 52 is a user input. An operator can therefore select the time basis for carrying out the time normalization. A time normalization can therefore take place on the basis of days, weeks, months or years. The input quantity 53 is a reference time. This is the time at which the overall MES device or the first component of the same was put into operation. The input quantity 54 is the currently measured time. On the basis of these input quantities 52, 53 and 54, the time normalizer 51 determines an output quantity 55. This output quantity 55 is a normalized time variable which is valid for the overall MES device. The output quantity 55 according to FIG. 8 therefore corresponds to the input quantity 31 according to FIG. 5.

Figure 9:
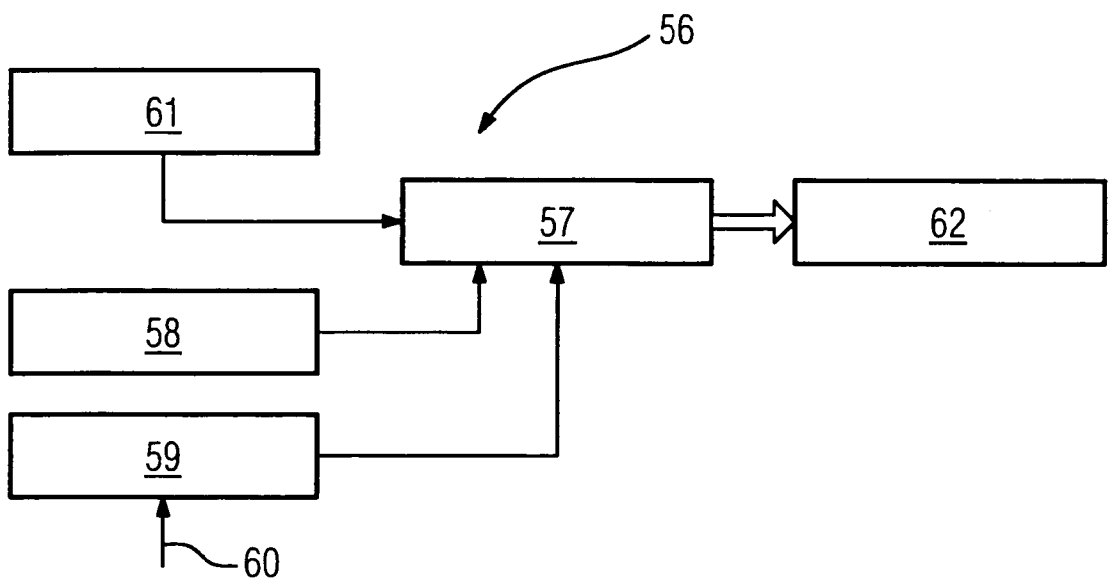
FIG. 9 shows a block diagram of a further time normalizing entity of the device according to the invention for process optimization.

FIG. 9 shows a further time normalizing entity 56. However, this time normalizing entity 56 is not a time normalizing entity for the overall MES device, but is instead a time normalizing entity for an individual specific optimization entity of the overall MES device. It is therefore entirely possible for individual components of the MES device to be acquired at different times. The reference time at which the corresponding optimization entity was acquired must therefore be supplied to a time normalizer 57 of the time normalizing entity 56 as input quantity 58. The input quantity 59 of FIG. 9 is again a current measured time, and actually applies for every individual optimization entity of the overall MES device, as shown by an arrow 60 in FIG. 9. The input quantity 61 according to FIG. 9 is again a user input for selecting the time normalization standard in days, weeks, months or even years. The time normalizer 57 then determines an output quantity 62 from the input quantities 58, 59 and 61. In this case, this is an individual time normalization for every optimization entity of the MES device.

Figure 10:
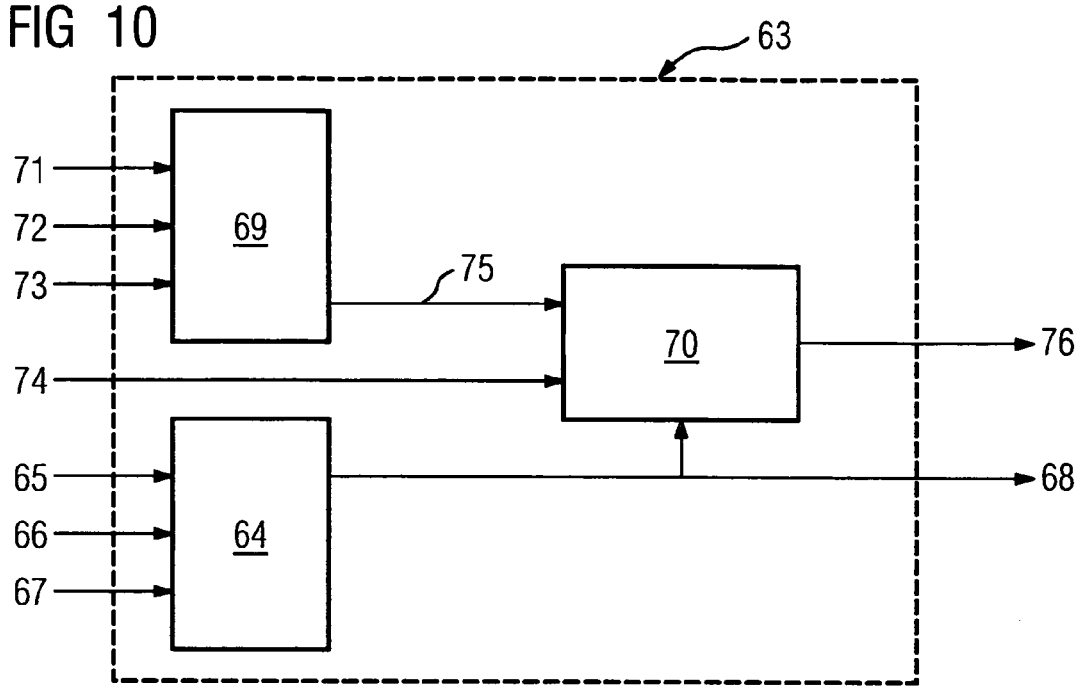
FIG. 10 shows a block diagram of a process-quantity normalizing entity of the device according to the invention for process optimization.

In addition to a time normalization, a process quantity normalization is also carried out. Such a process quantity normalization entity 63 is shown in FIG. 10. The process quantity normalization entity 63 which is shown in FIG. 10 has a scaling entity 64, to which three input quantities 65, 66, 67 are supplied. The first input quantity 65 is a current measured value of a process parameter which has to be optimized, the input quantity 66 is a reference value and the input quantity 67 is a normalization factor. Therefore it is entirely possible for the input quantities 65 and 66—i.e. the measured values of the process parameter and the reference values of the same—to be present in different units. In order to allow consistent further processing of the determined values in the evaluation entities, the unit of the currently measured value of the process parameter must be adapted to the unit of the corresponding reference value using the normalization factor. To this extent, the scaling entity 64 of the process quantity normalization entity 63 provides an output quantity 68 which can be further processed consistently in the evaluation entities. The input quantity 65 can be the measured value of a process parameter, for example, said value describing the volume of raw material which has been saved in kilograms, for example. If the input quantity 66, i.e. a reference value for the process parameter, e.g. the costs per unit of volume, is present in a different unit, e.g. euros/ton, the third input quantity 67 which is the normalization factor must be used to carry out a unit adaptation and therefore a normalization of variables between the current measured values of the process parameter and the corresponding reference values. This normalized quantity is then provided as output quantity 68.

One process quantity normalization entity 73 including the scaling entity 64 would be sufficient for a continuously executing production process. However, if the device according to the invention must also be capable of monitoring and evaluating so-called batch processes, the process quantity normalization entity 63 contains a second scaling entity 69 and a third scaling entity 70 in addition to the first scaling entity 64. Three input quantities 71, 72, 73 act on the second scaling entity 69. From these, the second scaling entity 69 generates an output quantity 75 which is provided to the third scaling entity 70 together with a further input quantity 74. From these two input quantities and the output signal of the first scaling entity 64, the third scaling entity 70 then generates a further output quantity 76 of the process quantity normalization entity 63. The input quantity 71 for the second scaling entity 69 is a time normalization standard. This can be expressed in days, weeks, months or years. The input quantity 62 is a reference time. The input quantity 73 is an amount of batch events which occur in the relevant reference period. From this, the second scaling entity 69 determines an output quantity 75 which provides the amount of the batch processes for the relevant process parameter in a normalized time. The input quantity 74 is a statement about whether a batch process or a continuously executing process exists for the corresponding process parameter. If a continuously executing process exists, the processing in the third scaling entity 70 is merely deactivated. Only if a so-called batch process exists is the third scaling entity 70 activated and the output quantity 76 determined. An output quantity 76 is determined accordingly in the third scaling entity 70 from the output quantity 68 of the first scaling entity 64 and the output quantity 75 of the second scaling entity 69, then normalized so that it can be further processed by the evaluation entities. Using the process quantity normalization entity 63 which is shown in FIG. 10, it is therefore possible to normalize all types of process parameter, irrespective of the unit in which they are measured and irrespective of whether they are process parameters of a continuously executing process or a batch process, such that consistent further processing in the evaluation entities is possible.

Figure 11:
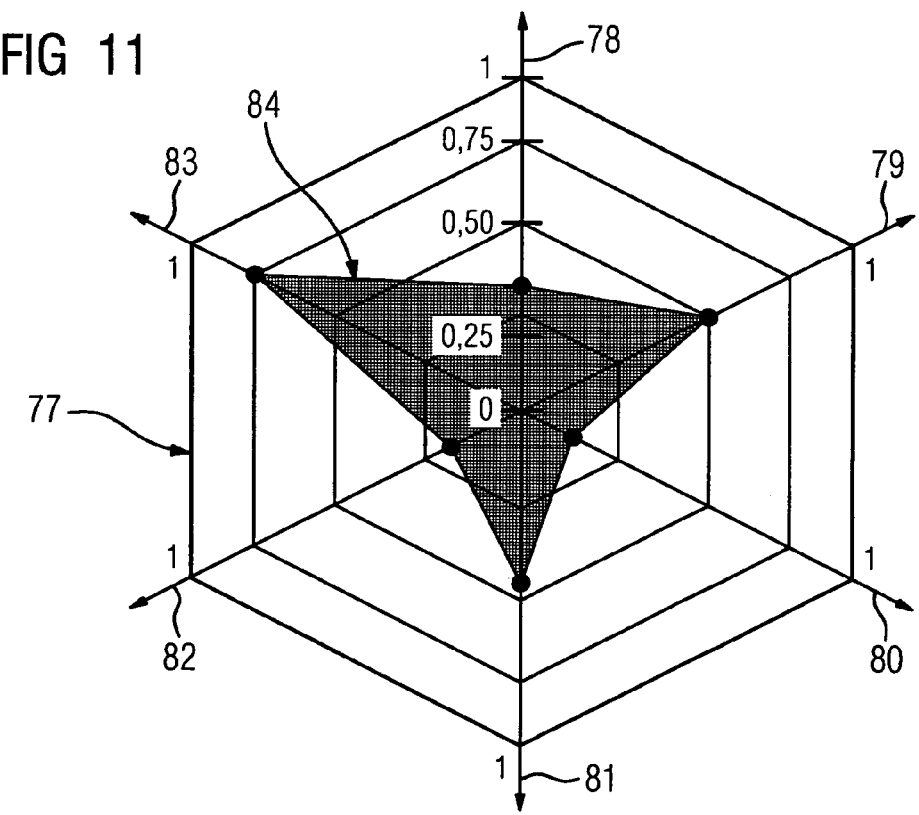
FIG. 11 shows a diagram for displaying the overall optimization which has been determined by the device according to the invention and the optimization which has been effected by each optimization entity involved.

The device according to the invention or the MES device according to the invention includes a display entity, which is not illustrated in detail but makes it possible to depict the optimization values as determined online and in real time of the individual process parameters or the overall optimization. FIG. 11 therefore shows a so-called spider diagram 77 for dynamically depicting the effected optimization. The spider diagram 77 according to FIG. 11 therefore includes a total of six axes 78, 79, 80, 81, 82 and 83. Each axis 78, 79, 80, 81, 82, 83 corresponds to an optimization entity of the MES device.

A return-of-investment factor is specifically shown for each of the six optimization entities. If the value of the return-of-investment factor is one, this means that the optimization of the process, which optimization is effected by the specific optimization entity, corresponds to the investment value of the specific optimization entity. In other words, when its return-of-investment factor has the value of one, an optimization entity has optimized the process via savings or yield increases to the extent that exactly the investment costs of the corresponding optimization entity are covered. If the return-of-investment factor is less than one, the specific optimization entity is not yet amortized at the current time point. However, if the return-of-investment factor is greater than one, the investment costs of the specific optimization entity are fully amortized by the effected optimization and, furthermore, a first actual profit is being provided by the optimization entity. In FIG. 1, all six return-of-investment factors of the six optimization entities are still below the value of one. Therefore none of the six optimization entities has reached the so-called break-even point at the current time point which is illustrated in FIG. 11.

As also shown in FIG. 11, the individual return-of-investment factors of the six optimization entities are interconnected and thus cover a surface 84. This covered surface 84 corresponds to the overall return of investment of all optimization entities of the overall device according to the invention. In this respect, the dynamic spider diagram which is shown in FIG. 11 makes it possible to depict not only the effected optimization of the individual optimization entities but also the effected overall optimization at the same time.

At this point, it should be noted that the depicting of the achieved optimization success or the achieved return of investment, as illustrated in connection with FIG. 11, can be made even clearer for the observer by means of colored highlighting. For example, if the currently achieved return-of-investment factor of a specific optimization entity is less than one, the corresponding value in the spider diagram can be marked with a red point. However, if the return of investment already has a value which is greater than one, this point is marked in green in the spider diagram.

The same applies to the graphical configuration of the surface which is covered by the individual return-of-investment factors. If the surface 84 which is covered by the individual return-of-investment factors of the specific optimization entities is smaller than the surface which is covered in the spider diagram by those points that correspond to a return-of-investment factor of one, this surface is highlighted in red. This would signify that the overall MES device has not yet been amortized. If this surface area is exceeded, however, the area is highlighted in green in order to show that the overall investment costs of the MES device have been amortized.

Instead of the aforementioned graphical spider diagram, or in addition to said spider diagram, it is also possible numerically to depict the optimization values as determined online and in real time of the individual process parameters or the overall optimization. This numeric depicting in the form of numerical values can be updated continuously—i.e. online and in real time.

It should be noted that the device according to the invention can also be used for simulating an achievable process optimization. If simulated values of process parameters are used instead of currently determined values of monitored process parameters, the device according to the invention then serves to simulate the achievable process optimization.

In order to avoid repetition in regard to this, it is merely explained briefly here that a device for simulating an achievable process optimization comprises at least one optimization entity for the simulated influencing of one or more process parameters and at least one monitoring entity for monitoring the or each simulated process parameter. At least one evaluation entity serves automatically to determine an optimization, which can be effected by the or each optimization entity, of the or each process parameter. Each process parameter which must be optimized and is simulatively influenced by one or more optimization entities is assigned an evaluation entity, such that the optimization which can be effected on the relevant process parameter by all participating optimization entities can be determined by the evaluation entity online and in real time. The or each evaluation entity has at least one evaluation module for automatically determining an optimization, which can be effected by a specific optimization entity, of the corresponding process parameter. All evaluation entities are also connected to an overall evaluation entity, such that the overall optimization which can be effected for all process parameters can be determined by the overall evaluation entity.

A device for simulating an achievable process optimization is constructed in exactly the same way accordingly. Reference can therefore be made to the above explanations and all claims relating to the device or the method for process optimization.

The invention claimed is:

1. A device for process optimization, comprising:
at least one optimization entity for influencing at least a process parameter;
at least one monitoring entity for monitoring the process parameter; and
at least one evaluation entity for automatically determining an optimization of the process parameter, each evaluation entity comprises at least one evaluation module, a number of evaluation models is determined by a number of optimization entities that influence a particular process parameter with each evaluation module comprising a comparator to compare a reference value of a specific process parameter with an actual value of the process parameter and a first multiplier configured to apportion a difference between the reference value and the actual value using a third input quantity, the value determined by the multiplier forms an output quantity of the evaluation entity,
an integrator configured to integrate the output quantity provided by the first multiplier over a time period defined by a reference time and a current time to produce an output value, a second multiplier having at least one input external the at least one evaluation entity that is a percentage factor by which a specific optimization entity exerts influence on the process parameter, the percentage factor is multiplied with the output value from the integrator to produce an apportioned optimization output value; and
a memory device configured to retain a difference between the reference value and the actual value prior to supplying the difference to the multiplier;
wherein the apportioned optimization output value is applied to the process parameter per optimization entity when more than one optimization entity is utilized.

2. The device according to claim 1, wherein the process parameter which must be optimized, and which is influenced by the optimization entity, is assigned an evaluation entity such that the optimization which is effected on the process parameter by the optimization entity can be determined by the evaluation entity online and/or in real time.

3. The device according to claim 1, wherein the evaluation entity has at least one evaluation module for automatically determining an optimization of a corresponding process parameter, wherein the optimization is effected by a specific optimization entity.

4. The device according to claim 3, wherein the evaluation module is used for automatically determining a yield increase which is effected in relation to a relevant process parameter or for automatically determining a cost saving which is effected in relation to a relevant process parameter.

5. The device according to claim 3, wherein the number of evaluation modules in an evaluation entity which is assigned to a process parameter is dependent on the number of optimization entities which influence the process parameter concerned.

6. The device according to claim 3, wherein the evaluation modules provide an absolute optimization value and a time-related optimization value as output values, thereby allowing absolute and time-related recording of the optimization which is effected for relevant process parameter by each optimization entity.

7. The device according to claim 1, wherein all evaluation entities are connected to an overall evaluation entity, such that the effected overall optimization of all process parameters can be determined online and in real time by the overall evaluation entity.

8. The device according to claim 1, wherein at least one time normalization entity is provided for normalizing time quantities.

9. The device according to claim 1, wherein at least one process-quantity normalization entity is provided for normalizing all process quantities which are used by all entities.

10. The device according to claim 9, wherein the process-quantity normalization entity is used for normalizing variables and/or parameters.

11. The device according to claim 1, wherein a display entity for visualizing the effected optimization of the or each process parameter and/or for visualizing the effected overall optimization of all process parameters.

12. The device according to claim 11, wherein the display entity simultaneously depicts the effected optimization of each individual process parameter and the effected overall optimization of all process parameters online and/or in real time in a dynamic spider diagram.

13. An MES (manufacturing execution system) device for optimizing processes, wherein the MES device is connected between an enterprise and production planning system and a monitoring and control system, the MES device comprising:
at least one optimization entity for influencing one or more process parameters of the monitoring and control system;
at least one data determining entity for monitoring the or each process parameter to determine variables necessary for determining optimization success;
at least one evaluation entity for automatically determining an optimization of the process parameter, each evaluation entity comprises at least one evaluation module, a specific number of evaluation models is determined by a number of optimization entities that influence a particular process parameter, each evaluation module comprising a comparator to compare a reference value of a specific process parameter with an actual value of the process parameter and a first multiplier configured to apportion a difference between the reference value and the actual value using a third input quantity, the value determined by the multiplier forms an output quantity of the evaluation entity, an integrator configured to integrate the output quantity provided by the first multiplier over a time period defined by a reference time and a current time to produce an output value, a second multiplier having at least one input external the at least one evaluation entity that is a percentage factor by which a specific optimization entity exerts influence on the process parameter, the percentage factor is multiplied with the output value from the integrator to produce an apportioned optimization output value; and
a memory device configured to retain a difference between the reference value and the actual value prior to supplying the difference to the multiplier;
wherein the apportioned optimization output value is applied to the process parameter per optimization entity when more than one optimization entity is utilized.

14. The MES device according to claim 13, wherein the enterprise and production planning system is an ERP (enterprise resource planning) device, and wherein the monitoring and control system is a PLT (process instrumentation and control) device.

15. The MES device according to claim 13, wherein each process parameter of the monitoring and control system, which process parameter must be optimized and which process parameter is influenced by one or more optimization entities, is assigned an evaluation entity such that the optimization which is effected on the relevant process parameter by the corresponding optimization entities can be determined by the evaluation entity, so that an ROI (return of investment) value which is achieved by the relevant optimization entity can be determined online and/or in real time.

16. The MES device according to claim 13, wherein the or each evaluation entity has at least one evaluation module for automatically determining an ROI value of a respective process parameter, said ROI value being achieved by a respective optimization entity.

17. The MES device according to claim 13, wherein all evaluation entities are connected to an overall evaluation entity, such that the effected overall optimization of all process parameters, namely an overall ROI value of the MES device, can be determined online and/or in real time by the overall evaluation entity.

18. The MES device according to claim 13, wherein a display entity simultaneously displays the ROI values which have been achieved by the relevant optimization entities and the overall ROI value of the MES device online and/or in real time in a dynamic spider diagram.

19. A method for process optimization, comprising:
optimizing one or more process parameters by at least one optimization entity by comparing a reference value of a specific process parameter with an actual value of the process parameter;
determining an exact number of the at least one optimization entities used to optimize a specific process parameter;
apportioning a difference between the reference value and the actual value specific to each optimization entity based on how many are used to optimize the specific process parameter;
integrating a value provided by a multiplier over a time period to produce an output value specific to each optimization entity based on how many optimization entities are used to optimize the specific process parameter;
multiplying at least one input external entity that is a percentage factor by which a specific optimization entity exerts influence on the specific process parameter with the output value to produce an apportioned optimization output value;

retaining a difference between the reference value and the actual value prior to supplying the difference to the multiplier;

applying the apportioned optimization output value to the specific optimization entity when more than one optimization entity is provided to designate a percentage each optimization entity should provide to the specific process parameter;

monitoring the process parameters by at least one monitoring entity that produces a multi-axis spider diagram, each axis is associated with a process parameter;

automatically determining the optimization of the process parameters by at least one evaluation entity with values obtained from the multiplier.

20. The method according to claim 19, wherein a process parameter is optimized by one or more optimization entities, and wherein the optimization which is effected by each optimization entity for the relevant process parameter is determined online and/or in real time.

21. The method according to claim 19, wherein the effected optimization of all process parameters is determined online and/or in real time, and as an absolute and/or time-related quantity.

22. The method according to claim 19, wherein when more than the at least one optimization entity is provided, each percentage factor, associated with a cumulative number of optimization entities, may not cumulatively exceed 1.

* * * * *